(12) United States Patent  
Matsuyama et al.

(10) Patent No.: US 6,642,988 B2  
(45) Date of Patent: Nov. 4, 2003

(54) LIQUID CRYSTAL DISPLAY DEVICE WITH COLUMNAR SPACER

(75) Inventors: Shigeru Matsuyama, Mobara (JP); Hiroaki Asuma, Mobara (JP); Kazuhiko Yanagawa, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/098,058

(22) Filed: Mar. 15, 2002

(65) Prior Publication Data

US 2002/0093617 A1 Jul. 18, 2002

Related U.S. Application Data

(63) Continuation of application No. 09/592,655, filed on Jun. 13, 2000, now Pat. No. 6,411,360.

(30) Foreign Application Priority Data

Jun. 18, 1999 (JP) ............................................. 11-172080

(51) Int. Cl.[7] ..................... G02F 1/1339; G02F 1/1335; G02F 1/1333; G02F 1/1343
(52) U.S. Cl. ....................... 349/156; 349/155; 349/106; 349/110; 349/141
(58) Field of Search ................................. 349/155, 156, 349/106, 110, 42, 141

(56) References Cited

U.S. PATENT DOCUMENTS

| | | | | |
|---|---|---|---|---|
| 5,499,128 A | * | 3/1996 | Hasegawa et al. | 349/155 |
| 6,097,467 A | * | 8/2000 | Fujimaki et al. | 349/141 |
| 6,181,406 B1 | * | 1/2001 | Morimoto et al. | 349/106 |
| 6,356,330 B1 | * | 3/2002 | Ando et al. | 349/141 |
| 6,433,852 B1 | * | 8/2002 | Sonoda et al. | 349/141 |
| 2002/0008836 A1 | * | 1/2002 | Shibahara | 349/155 |

FOREIGN PATENT DOCUMENTS

JP        05-066410    *   3/1993

* cited by examiner

*Primary Examiner*—Tarifur R. Chowdhury

(57) ABSTRACT

For suppressing a brightness irregularity and contrast deterioration in a displaying screen of a liquid crystal display device which comprises a pair of substrates at least one of which is transparent, at least two kinds of color filters being formed on one of the pair of substrates, a black matrix being provided between the color filters, a group of electrodes being formed on either one of the pair of substrates, a layer of liquid crystal compounds sealed between the pair of substrates, due to noise electrical field appearing therein or unevenness of a cell gap between the pair of substrates, the present invention provides a columnar spacer having smaller resistivity than that of the liquid crystal compounds in a part of an area on the one of the pair of substrates which is hidden by the black matrix.

17 Claims, 13 Drawing Sheets

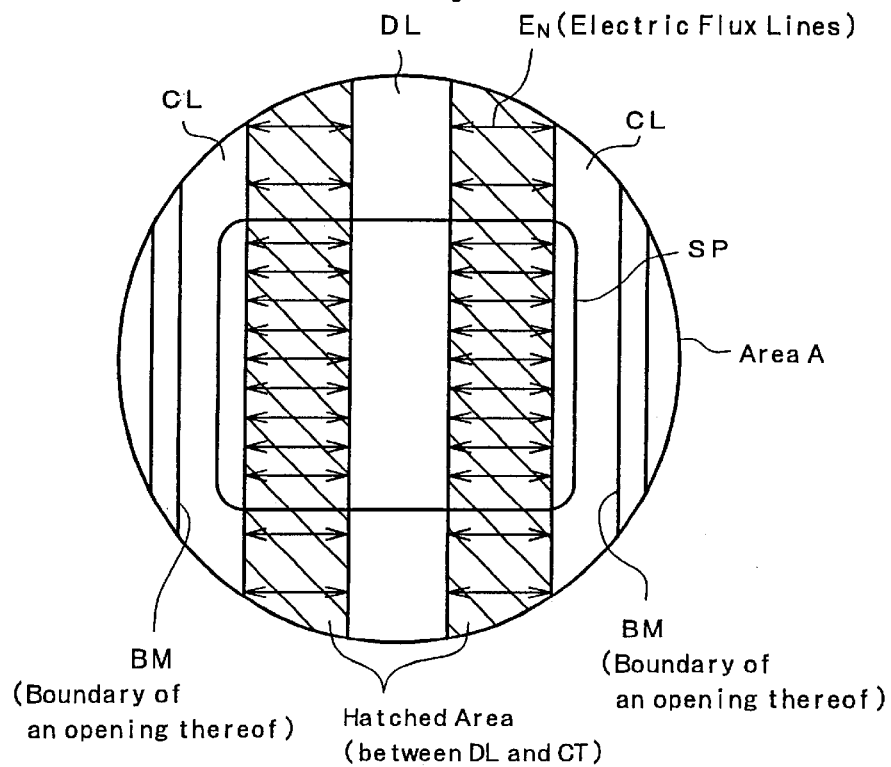
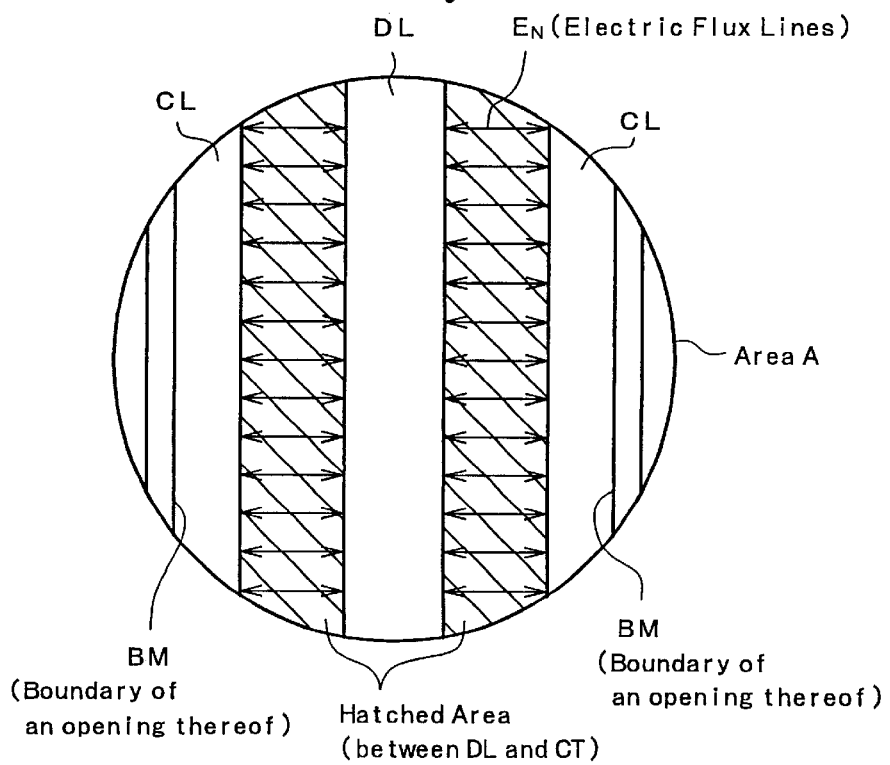

LIQUID CRYSTAL DISPLAY DEVICE WITH COLUMNAR SPACER

This application is a continuation application of U.S. application Ser. No. 09/592.655 filed on June 13, 2000 now U.S. Pat. No. 6,411,360.

BACKGROUND OF THE INVENTION

1. Field of the Invention

The present invention relates to a liquid crystal display device and, more particularly, to a liquid crystal display device comprising a spacer with a novel structure for keeping a distance between a pair of substrates thereof between which liquid crystal compounds are sealed, uniformly.

2. Description of the Related Art

Liquid crystal display devices are coming into wide use as display devices for notebook type computers or monitors of computers which can display color images with high definition image qualities.

The liquid crystal display device of this sort has basically so-called liquid crystal display panel being constructed by at least one pair of substrates at least one of which is formed of a transparent glass or plastic substrate, or the like, and interposing liquid crystal compounds in a gap (simply called, liquid crystals, or a liquid crystal layer, also hereinafter) between the one pair of substrates which are arranged so as to confront one another with the gap. Moreover, these liquid crystal display devices of are classified roughly into either a simple matrix type liquid crystal display device which lights a predetermined pixel thereof up/out by applying a voltage selectively to various electrodes of the pixel provided in the liquid crystal display panel, or an active matrix type liquid crystal display device which lights a predetermined pixel thereof up/out by selecting an active element for selecting the pixel, the active element being provided together with the various electrodes in the liquid crystal display panel.

The active matrix type liquid crystal display devices are represented by a type thereof using a thin film transistor (TFT) as the active matrix element constituting the liquid crystal display panel thereof. As the liquid crystal display devices comprising the liquid crystal display panels using the thin film transistors are thinly-made and lightweight, and provide high image qualities equal to those of cathode-ray tubes (Braun tubes), the liquid crystal display devices become widespread as monitors for displaying terminals of office automation apparatuses, or the like.

Displaying schemes for the liquid crystal display devices are classified broadly in accordance with driving methods of the liquid crystal display panels thereof into following two sorts. One of them is an image-displaying scheme by interposing liquid crystal compounds between a pair of substrates each of which has a transparent electrode formed on, by driving liquid crystal compounds in accordance with voltages applied to the transparent electrodes, and by modulating incident light into the layer of liquid crystal compounds through the transparent electrodes, and this scheme is employed in most of a currently popular products.

Another of the displaying schemes displays an image by generating electric fields between a pair of electrodes provided on the same substrate of the liquid crystal display panel substantially in parallel to a surface of the substrate so as to drive the liquid crystal compounds between the electrodes thereby, and by modulating incident light into a layer of the liquid crystal compounds through a gap between the pair of the electrodes. The liquid crystal display panel of this displaying scheme is characterized by an image having remarkably wide viewing angle displayed thereby, and thus an image of an extremely high quality can be obtained by an active matrix type liquid crystal display device using this liquid crystal display panel. Characteristics of this displaying scheme are described in such documents as e.g. Japanese Patent Application Laid-Open No. 05-505247 (JP-A-505247/1993), Japanese Patent Publication No. 63-021907 (JP-A021907/1988), Japanese Patent Application Laid-Open No. 06-160878 (JP-A160878/1994). The liquid crystal display device of this displaying scheme will be called a liquid crystal display device of a lateral electric field scheme, hereinafter. The liquid crystal display device of the lateral electric field scheme is also called an IPS (in Plane Switching) type liquid crystal display device.

FIG. 17 is a cross sectional view for explaining an electric field generated in a liquid crystal display panel constituting the liquid crystal display device of the lateral electric field type. The liquid crystal display panel has a video signal line DL, a counter electrode CT, and a pixel electrode PX each of which is formed on one of substrates thereof SUB1, a protective film PSV being deposited on these layers, and an alignment control layer (also called, an alignment layer, or alignment film) ORI1 being formed at an interface with the liquid crystal layer LC. The liquid crystal display panel also has color filters FIL partitioned by a black matrix BM formed on another of the substrates thereof SUB2, an overcoat layer OC being deposited over these layers in order to prevent composing materials of the color filters and the black matrix from affect the liquid crystal compounds (called, liquid crystals, also hereinafter), and an alignment control layer ORI2 being formed at an interface with the liquid crystal layer LC.

Insulating films GI, AOF are also formed on the one of the substrates SUB1. Moreover, the video signal line DL is formed of two conductive films d1 and d2 stacked on one another, the counter electrode is formed of a conductive film g1, and the pixel electrode PX is formed of a conductive film g2, wherein each of these is provided on the one of the substrates SUB1.

Furthermore, a distance between a pair of the substrates SUB1 and SUB2 (i.e. a thickness of the liquid crystal layer: a cell gap) is generally set at a predetermined value by dispersing inorganic-base or plastic-base spherical spacers (i.e. beads, but not shown in FIG. 17) between both of the substrates. On each outer surface of the substrates SUB1 and SUB2, a polarizer (a polarizer plate) POL1 or a polarizer (a polarizer plate) POL2 is stacked respectively.

On the other hand, Japanese Patent Application Laid-Open No. 09-073088 (JP-A-073088/1997) discloses conical spacers formed on the protective film on the color filter substrate (like a substrate SUB2, in FIG. 17) and columnar spacers formed by stacking color filter layers both of which are fixed to the color filter substrate, instead of such spherical spacers mentioned above regardless of the lateral electric field type liquid crystal display device.

The invention disclosed in Japanese Patent Application Laid-Open No. 09-073088 (JP-A-073088/1997) is to form conical spacers stably on the substrate so as to prevent deterioration of image contrast by light leaking through peripheries of the spherical spacers and displaying defects caused by spacers irregularly arranged during a step for spraying the spacers onto the substrate.

SUMMARY OF THE INVENTION

There are two problems to be solved by the present invention. First problem of the two problems is related to a design of pixels in the liquid crystal display panel of the lateral electric field scheme. For clarifying the problem, noise fields appearing in a area hidden by the black matrix will be mentioned.

In the liquid crystal display panel shown in FIG. 17, while an image is displayed by controlling orientation directions of liquid crystal molecules constituting the liquid crystal layer LC by applying the electric field $E_L$ generated substantially in parallel with the substrate between the pixel electrode PX and the counter electrode thereto, another electric field of contributing to displaying operation of the liquid crystal display panel (i.e. a noise field $E_N$) is also generated between the video signal line DL and the counter electrode CT. If a space between these electrode is too narrow, an intensity of the noise field $E_N$ appearing in an area between the video signal line DL and the counter electrode CT becomes so large that the liquid crystals LC in the area are driven by the noise field and consequently permit undesirable light to penetrate in the are therethrough.

Unless the area between these electrodes CT, DL is shielded by the black matrix BM, the displaying quality of the liquid crystal display panel is deteriorated significantly. More specifically, deterioration of contrasts and cross talk phenomena appear in a screen of the liquid crystal display panel.

Means for reducing the influence of the noise field are conceivable as follows. One of them is to widen either a space between the video signal line DL and the counter electrode CT or a space between the video signal line DL and the pixel electrode PX. However, the pixel area cannot but be smaller by this means, and thus an aperture ratio thereof is so reduced that brightness thereof will be reduced.

Incidentally, the similar problem appears in another structure in which the video signal line DL is arranged adjacent to the pixel electrode PX, instead of the structure of FIG. 17 in which the video signal line DL is arranged adjacent to the counter electrode CT.

Second problem of the two problems appears in a case for increasing optical density of the black matrix BM in order to improve a light shielding (obstructing) property thereof against unnecessary transmitted light higher. However, a following problem will appear by increasing optical density of the black matrix BM.

First of all, metals like a Chromium (Cr) having a high light shielding property cannot be used for a black matrix BM of the liquid crystal display panel of the lateral electric field scheme, because the black matrix needs to have a high resistance in the liquid crystal display panel of the lateral electric field scheme (ref. e.g. Japanese Patent Application Laid Open No. 09-043589 (JP-A-043589/1997)). Since, in the liquid crystal display panel of the lateral electric field scheme, the lateral electric fields being generated substantially in parallel with the substrate thereof for driving the liquid crystals are affected by the electric property of the black matrix thereof, an electric field generated between the aforementioned electrode provided in the pixel and the black matrix keeps the lateral electric field from being generated ideally for driving the liquid crystals if the resistance of the black matrix BM is low. Consequently, such problems as declines of brightness and contrast of the liquid crystal display panel, reduction of a viewing angle thereof, etc. arise.

A pigment-dispersion type photosensitive resin is also utilized as a material for a black matrix BM other than metals. The pigment-dispersion type photosensitive resin has a sufficiently high resistance for avoiding the aforementioned problems, but can hardly increase a light-shielding property (a light-obstructing property, or optical density) thereof because pigments concentration in the photosensitive resin needs to be increased so higher in order to obtain higher optical density thereof that workability thereof in a photolithography process is deteriorated due to reduction of the resin concentration (the concentration ratio of the photosensitive resin against the pigments). More specifically, such problems as deterioration of exposing resolution, decrease of developing margin, a tendency to generate residues of pigments, etc. appear during the photolithography process for the black matrix using the photosensitive resin.

Furthermore, in another case for increasing the optical density of the black matrix by thickening a thickness thereof, flatness of the color filters is so deteriorated that a rubbing workability of the alignment control layer ORI2 is deteriorated, the cell gap can hardly maintain its uniformity, and consequently displaying quality defects of the liquid crystal display device like deterioration of a response time (a response rate) thereof appear.

The second problem for the present invention is related to a structure for former spacers stably on a substrate of the liquid crystal display panel which constitutes the lateral electric field type liquid crystal display device. The spacers being formed stably on the substrate are called columnar spacers (a pillar spacers).

Since the spacers need to unify a thickness of the liquid crystal layer within a displaying screen of the liquid crystal display device, uniformity of respective film thickness of the columnar spacers is required. If the uniformity is not sufficient, brightness irregularity appears in a display screen of the liquid crystal display panel due to thickness deviation of the liquid crystal layer thereof. In a case for forming the columnar spacers on the substrate, it is difficult to make height of the columnar spacers even, because of a forming process thereof.

Generally, as the columnar spacers are formed by a series of steps for coating photosensitive resist on the color filter substrate or the TFT substrate, exposing the resist using a mask (masking exposure), and developing the exposed resist, dispersion of film thickness (height) of the columnar spacers appears in a substrate surface or in respective substrates due to non-uniformity of the coated photosensitive resist, non-uniformity of an optical irradiation intensity distribution in a substrate during the exposure step, non-uniformity of a development in the substrate during developing step in a substrate surface, etc. Under these circumstances, luminance irregularity due to non-uniformity of the cell gap appears in the display screen.

On the other hand, a mechanical characteristic of the spacers acquires importance for manufacturing the liquid crystal display panel. Since such composing layers as various electrodes, insulating films, thin film transistors, or the like are formed so as to overlap partially with each other on a substrate surface being opposite to the liquid crystal compounds in the liquid crystal display panel, an uppermost surface of the substrate is not even and has steps not higher than 1 $\mu$m in height.

Therefore, the spacers have to be squeezed between the substrates or to be stuck into the composing layer formed on the substrate, when a pair of the substrates are aligned with one another so as to keep the cell gap therebetween uniform. Therefore, the columnar spacers are required to have mechanical properties as elasticity, hardness, etc. being equal to those of the spherical spacers.

However, the columnar spacers formed of such organic substances as the photosensitive resin can hardly obtain the mechanical properties equivalent to those of inorganic matter (e.g. silica, or else)-base spherical spacers or plastics-base spacers.

One of the objectives of the present invention is to solve each of the aforementioned problems, and to provide a liquid crystal display device using a liquid crystal display panel being free from deterioration of contrasts and brightness thereof, and the cross talking appearing therein, without decreasing an aperture ratio thereof, and despite the black matrix having relatively low optical density being used thereby.

For achieving the aforementioned objectives, one of the present inventions is characterized in that it defines resistivity or a dielectric constant (permittivity) of a columnar spacer being formed between a pair of substrates which constructing a liquid crystal display panel of a liquid crystal display device, in predetermined relationship to those of a liquid crystal compound in the liquid crystal display panel.

Moreover, another of the present inventions is characterized in that a structure of the columnar spacer includes a solid particle having a size substantially equal to a thickness of a liquid crystal layer (a cell gap) of the liquid crystal display panel.

Furthermore, the other of the present inventions is characterized in that a structure of the columnar spacer includes the solid particle having electrical conductivity, or another structure of the columnar spacer includes the solid particle together with a electrical conductive particle.

Representative structures of the present inventions are described as following structures (1) through (7).

Structure (1)

In a liquid crystal display device which comprises:
- a liquid crystal display panel having a pair of substrates at least one of which is transparent, at least two kinds of color filters being formed on one of the pair of substrates, respective kinds of which have different colors from each other, a black matrix being provided between the color filters, a group of electrodes being formed on either one of the pair of substrates, a layer of liquid crystal compounds which have dielectric anisotropy and are sealed between the pair of substrates, and an alignment control layer for aligning molecules in the layer of the liquid crystal compounds; and
- a driving means for applying driving voltage to the group of electrodes for displaying an image by the liquid crystal display panel,
- a columnar spacer having smaller resistivity than that of the liquid crystal compounds is formed in a part of an area on the one of the pair of substrates, and the area is hidden by the black matrix.

According to the construction, a noise (electric) field is generated easily around the columnar spacer rather than in the liquid crystals, and thus a component of the noise field affecting a driving condition of the liquid crystals is decreased. Therefore, deterioration of contrast and brightness of the liquid crystal display panel and cross talks generated therein are suppressed even if a black matrix having relatively low optical density is used therein.

Structure (2)

In the structure (1), a relative dielectric constant (relative permittivity) of the columnar spacer is set to be larger than that of the liquid crystal compounds.

According to the construction, the noise field is generated easily around the columnar spacer rather than in the liquid crystals similarly to the structure (1), and thus component of the noise field affecting a driving condition of the liquid crystals is decreased. Therefore, deterioration of contrast and brightness of the liquid crystal display panel and cross talk generated therein are suppressed even if a black matrix having relatively low optical density is used therein.

Structure (3)

In either one of the structures (1) and (2), solid particles of an inorganic matter base material (e.g., an inorganic material) or a plastic base material (e.g., an plastic, or a resin material) is mixed into the columnar spacer.

Generally, mechanical characteristics (elasticity, hardness, etc.) of the columnar spacers being formed of a photosensitive resist processed by exposure and development thereof are inferior to those of a spherical spacer formed of silica or hard plastic (called, a bead). Furthermore, non-uniformity of film thickness of the columnar spacers as finished is difficult to be avoided. According to the construction, uniformity of the cell gap can be kept by mixing solid particles similar to the aforementioned spherical beads into the columnar spacer and by adjusting the mechanical characteristics of the columnar spacer with a material and mixing amount of the solid particles. In addition, according to this construction, an optical leak due to the noise field can be reduced by adjusting electrical characteristics of the columnar spacer with a material of the spherical bead and amount thereof into the columnar spacer, also.

Structure (4)

In the structure (3), the solid particles are coated with an electrically conductive material (i.e. a conductive material). Silver particles is one of preferred conductive materials for this structure. An electrical characteristic of the columnar spacer is able to be controlled by mixing the solid particles coated with the conductive material into the columnar spacer, and light leakage is also avoided thereby. In this structure, the solid particles coated with the conductive material can be used together with spherical beads not coated with a conductive material, also.

Structure (5)

In either one of the structures (1) and (2), a mixture of solid particles of an inorganic matter base material (e.g., an inorganic material) or a plastic base material (e.g., an plastic, or a resin material) and particles of an electrically conductive material is mixed into the columnar spacer.

A silver particle is preferable for the conductive particle, and resistivity of the columnar spacer can be adjusted by mixing the conductive particles thereinto. Therefore, the noise field can be led into the columnar spacer side rather than the liquid crystal compounds side, and thus generation of the optical leakage can be suppressed.

Structure (6)

An average particle diameter (an average particle size) of the solid particles in structure (3), the solid particles in the structure (4) on a surface of which is coated with a (electrically) conductive material, or the solid particles or the particles of the conductive material in the structure (5), is set to approximate a thickness of the layer of the liquid crystal compounds.

According to the construction, even if the columnar spacers cannot obtain uniform height thereof due to some thereof formed small in film thickness, the display defects like brightness irregularity in a displaying area of the liquid crystal panel can be suppressed by setting the cell gap to a desired value with any particle diameter of the aforementioned particles.

Structure (7)

In a liquid crystal display device which comprises:

a liquid crystal display panel having a pair of substrates at least one of which is transparent, at least two kinds of color filters being formed on one of the pair of substrates, respective kinds of which have different colors from each other, a black matrix being provided between the color filters, a group of electrodes being formed on either one of the pair of substrates, a layer of liquid crystal compounds which have dielectric anisotropy and are sealed between the pair of substrates, and an alignment control layer for aligning molecules in the layer of the liquid crystal compounds; and a driving means for applying driving voltage to the group of electrodes for displaying an image by the liquid crystal display panel, a columnar spacer having a smaller relative dielectric constant (smaller relative permittivity) than that of the liquid crystal compounds is provided so as to cover an area (preferably a whole area) between electrodes of the group of electrodes which is hidden by the black matrix.

According to the construction, the liquid crystal compounds are excluded from an area where the columnar spacer is formed, and thus the noise (electric) field is generated in the columnar spacer. Therefore, deterioration of contrast and brightness of the liquid crystal display panel and cross talks generated therein are suppressed even if a black matrix having relatively low optical density is used therein.

Structure (8)

In the structure (7), solid particles of an inorganic matter base material (e.g., an inorganic material) or a plastic base material (e.g., an plastic, or a resin material) is mixed into the columnar spacer.

Structure (9)

In the structure (8), the solid particles are coated with an electrically conductive material (i.e. a conductive material). Silver particles is one of preferred conductive materials for this structure. In this structure, the solid particles coated with the conductive material can be used together with spherical beads not coated with a conductive material, also.

Structure (10)

In the structures (8), a mixture of solid particles of an inorganic matter base material (e.g., an inorganic material) or a plastic base material (e.g., an plastic, or a resin material) and particles of an electrically conductive material is mixed into the columnar spacer.

Structure (11)

An average particle diameter (an average particle size) of the solid particles in the structure (8), the solid particles in the structure (9) on a surface of which is coated with an (electrically) conductive material, or the solid particles or the particles of the conductive material in the structure (10), is set to approximate a thickness of the layer of the liquid crystal compounds.

Advantages due to the constructions (8)–(10) are similar to those described in accordance with the aforementioned constructions (3)–(5), respectively.

Incidentally, the present invention is not limited to any of the above-described structures and the structures of embodiments which will be described below, and it goes without saying that various modifications can be made without departing from the technical ideas of the present invention.

These and other objects, features and advantages of the present invention will become more apparent from the following description when taken in conjunction with the accompanying drawings.

BRIEF DESCRIPTION OF THE DRAWINGS

FIG. 3 is an expanded plan view of an area A in FIG. 1 for explaining the noise fields at the columnar spacer area shown as the area A, schematically;

FIG. 4 is another expanded plan view of the area A (without the columnar spacer SP provided thereat) for explaining schematically the noise fields at the same area A as that of FIG. 3 when the columnar spacer SP is not provided thereat;

FIG. 7A shows a cross sectional view drawn in a similar manner to that for FIG. 5, and FIG. 7B shows a structural drawing of the spherical beads in FIG. 7A;

DETAILED DESCRIPTION

An embodiment of the present invention will be described below in detail with reference to drawings of the embodiments.

Figure 1:
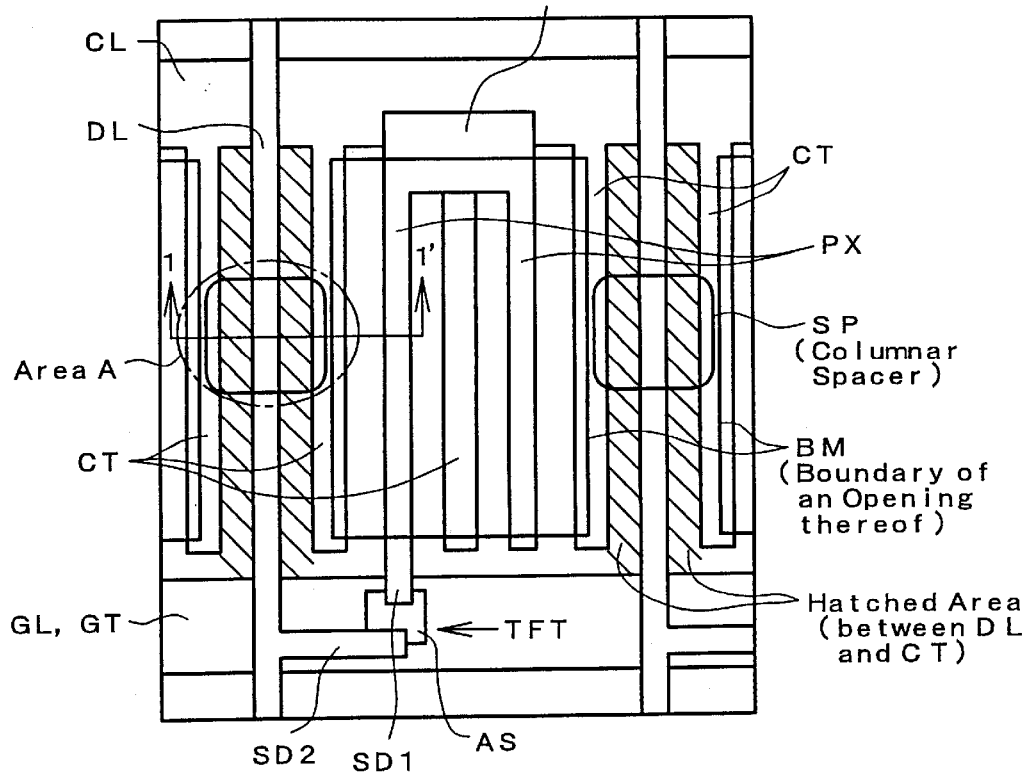
FIG. 1 is a plan view for explaining a periphery of a pixel of a liquid crystal display panel constituting an active matrix type liquid crystal display device of a lateral electric field scheme as a first embodiment of a liquid crystal display device according to the present invention, schematically.
Figure 2:
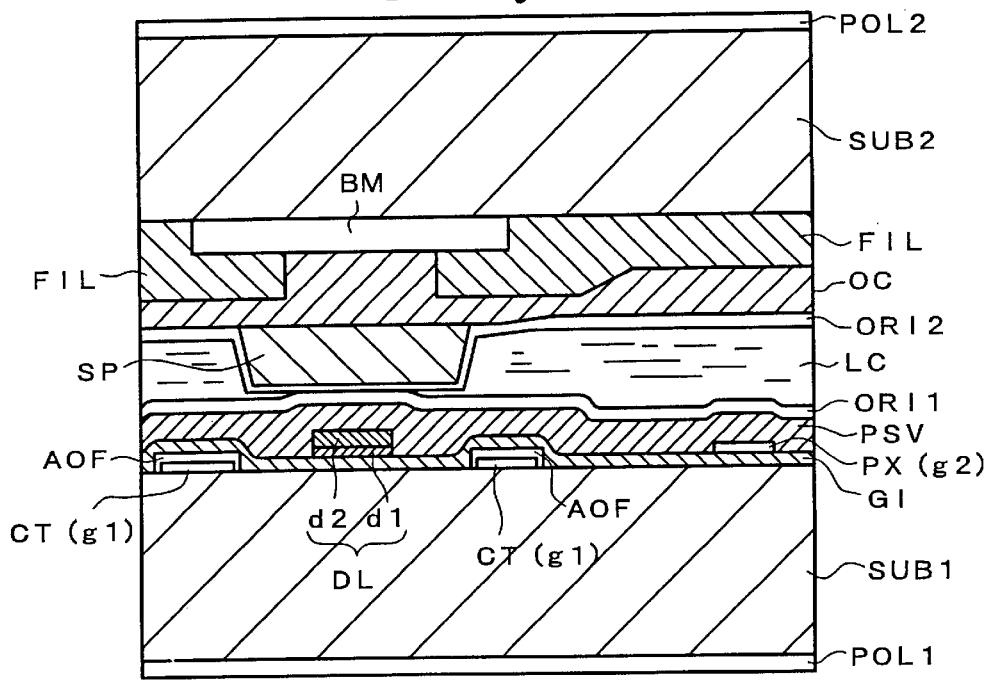
FIG. 2 is a cross sectional view taken along a line 1–1' in FIG. 1.
Figure 17:
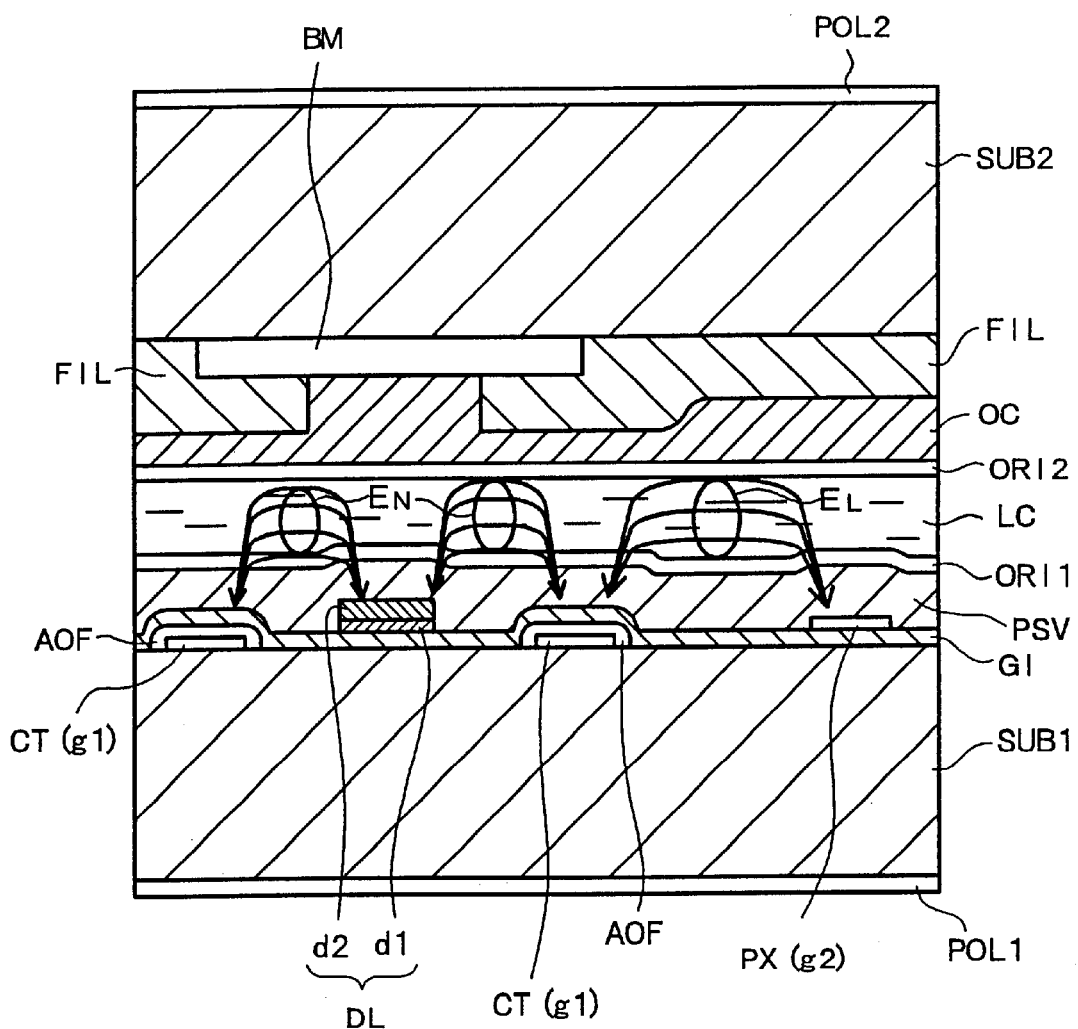
FIG. 17 is a cross sectional view for explaining electric fields generated in the liquid crystal display device of the lateral electric field scheme.

FIG. 1 is a plan view for explaining a periphery of a pixel of a liquid crystal display panel constituting an active matrix type liquid crystal display device of a lateral electric field scheme as a first embodiment of a liquid crystal display device according to the present invention schematically, and FIG. 2 is a cross sectional view taken along a line 1–1' in FIG. 1. The same notations in FIGS. 1 and 2 as those in the aforementioned FIG. 17 correspond to elements having the same functions as those which the elements shown in FIG. 17 have, except for columnar spacers.

FIG. 1 shows a video signal line DL, a drain electrode SD2 being extended from the video signal line, a counter voltage signal line CL, a counter electrode CT identical to the counter voltage signal line, a pixel electrode PX, a source electrode SD1 identical to the pixel electrode, a storage capacitance Cstg, a scanning signal line GL, a gate electrode GT identical to the scanning signal line, a black matrix BM (shown as a boundary of an opening of a pixel), a thin film transistor TFT, and a columnar spacer (a pillar spacer) SP, therein respectively. In addition, a hatched area in FIG. 1 denotes an area between the video signal line DL and the counter electrode CT.

Moreover, FIG. 2 shows one of a pair of substrates constituting the liquid crystal display panel (called an active matrix substrate, or a TFT substrate, also) SUB1 and another thereof (called a color filter substrate, or a CF substrate, also) SUB2, a gate insulating film GI, a passivation layer (a protective film) PSV, an alignment film on the one of the pair of substrate ORI1, a liquid crystal layer LC, an alignment film on the another of the pair of substrate ORI2, a protective layer (an overcoat layer) OC, a color filter FIL, and the black matrix BM, therein respectively.

The video signal line DL (d1, d2), the counter electrode CT (g1), the pixel electrode PX (g2), and insulating films of aluminum oxide are also shown in FIG. 2. Each of the denotation of d1, d2, g1, and g2 in the parentheses denotes a conductive layer forming the wiring (hard wire) or the electrodes corresponding thereto. At each outside of the pair of substrates SUB1 and SUB2, a polarizer (a polarizer plate) POL1 or POL2 is provided.

The columnar spacer SP is formed out of a resist of the same material as that of the alignment layer ORI2 on one of the substrates SUB2, and provides a designated cell gap between the substrates by contacting another of the substrates SUB1 being opposite thereto. Since the other of the structures disclosed in FIG. 2 are already known, detailed explanations thereof are omitted here.

Moreover, the columnar spacer SP may be formed on an active matrix substrate (one of the substrates SUB1), while the columnar spacer in this embodiment is formed on a color filter substrate (another of the substrates SUB2). Additionally, a number of the columnar spacers SP for every pixel should not be limited to two, while that of this embodiment is two by arranging one columnar spacer at each of right and left sides of the pixel. Furthermore, the columnar spacer SP in this embodiment has an almost quadrilateral shape, but the columnar spacer may also have the other shape of e.g. a circle, an ellipse, a lozenge, or the like.

Basis for avoiding light leakage due to the noise field between the video signal line DL and the counter electrode CT by the structure of this embodiment will be explained as follows.

FIG. 3 is an expanded plan view of an area A in FIG. 1 for explaining the noise fields at the columnar spacer area shown as the area A, and FIG. 4 is another expanded plan view of the area A not having the columnar spacer SP provided thereat for explaining the noise fields at the same area A as that of FIG. 3 when the columnar spacer SP is not provided thereat.

The liquid crystals exist in an area in FIG. 3 (the circled area of the area A) other than the columnar spacer SP. On the other hand, the liquid crystals LC exist in a whole area in FIG. 4 (the circled area of the area A). If resistivity of the columnar spacer SP is smaller than that of the liquid crystals LC, the noise field $E_n$ shown as electric flux lines tends to be generated mainly at a side of the columnar spacer SP (a portion enclosed by an outline of the columnar spacer SP) rather than at a side of the liquid crystals LC (the rest portion of FIG. 3 not enclosed by an outline of the columnar spacer SP).

On the other hand, the noise field $E_N$ is generated almost uniformly between the video-signal line DL and the counter electrode CT, in the structure of FIG. 4 not having the columnar spacer.

In this way, the noise field EN in the portion (where the liquid crystals exist) of FIG. 3 except for the columnar spacer SP thereof is smaller than that in the structure without the columnar spacer SP shown in FIG. 4. Therefore, the liquid crystals LC are hard to be driven by the noise field in the structure of FIG. 3, so that the light leakage therefrom is reduced.

Consequently, the light leakage will be obstructed even if the optical density of the black matrix is relatively low. In other words, by employing the structure of FIG. 3, the optical density required for the black matrix BM is reduced in comparison with that in the structure without the columnar spacer SP.

Figure 5:
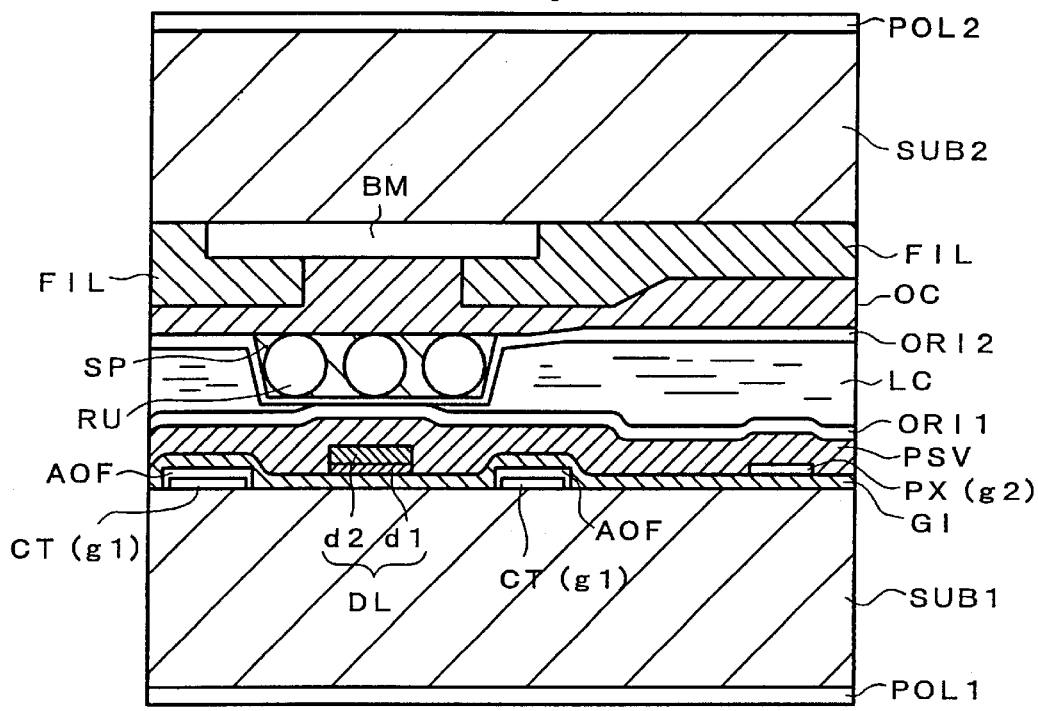
FIG. 5 is a cross sectional view drawn in the similar manner to that of FIG. 2 and being utilized for explaining a periphery of a pixel in the liquid crystal display panel constituting the active matrix type liquid crystal display device of the lateral electric field scheme as a second embodiment of the liquid crystal display devices according to the present invention, schematically.

FIG. 5 is a cross sectional view drawn in the similar manner to that of FIG. 2 and being utilized for explaining a periphery of a pixel in the liquid crystal display panel constituting the active matrix type liquid crystal display device of the lateral electric field scheme as a second embodiment of the liquid crystal display devices according to the present invention.

Since an ultraviolet (UV) ray setting type (an ultraviolet ray hardening type) photosensitive resin is utilized for a composing material of the columnar spacers SP generally, the aforementioned electrical property is hard to be set to a desired value. In this embodiment, the columnar spacer SP includes inorganic material base spherical beads RU. More specifically, silica beads are utilized as the spherical beads RU.

By forming the columnar spacer in this manner, mechanical characteristics of the columnar spacer, i.e. hardness, elasticity, etc. thereof can approximate those required for providing a cell gap between the two substrates constituting the liquid crystal display panel by pressing the substrates on one another. Additionally, the electrical characteristic of the columnar spacer is adjustable by these spherical beads, so that the aforementioned noise fields generated in the columnar spacer and the vicinity thereof can be set to the preferable values, respectively.

Figure 6:
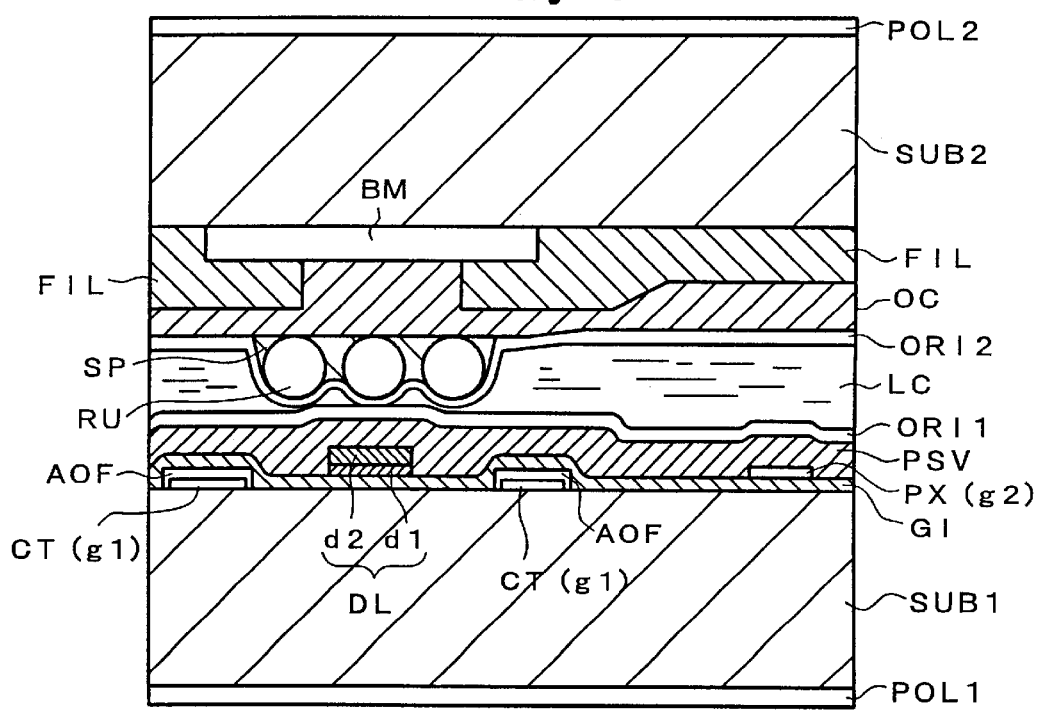
FIG. 6 is a cross sectional view drawn in the similar manner to that of FIG. 5 and being utilized for explaining a cell gap formed in case that film thickness of the columnar spacer is small.

FIG. 6 is a cross sectional view drawn in a similar manner to that of FIG. 5 and being utilized for explaining a cell gap formed in case that film thickness of the columnar spacer is small. As FIG. 6 shows, the desired cell gap will be provided in accordance with largeness (average particle diameter) of the spherical beads RU of inorganic matter base or plastic matter base (the spherical beads in this embodiment are formed of silica) by including the beads RU in the columnar spacers SP, even if the film thickness (height) of the columnar spacers is deviated from each other.

According to this embodiment, a liquid crystal display device of a high quality in which the light leakage is suppressed and irregularities in both contrast and brightness are reduced can be obtained.

Figure 7A:
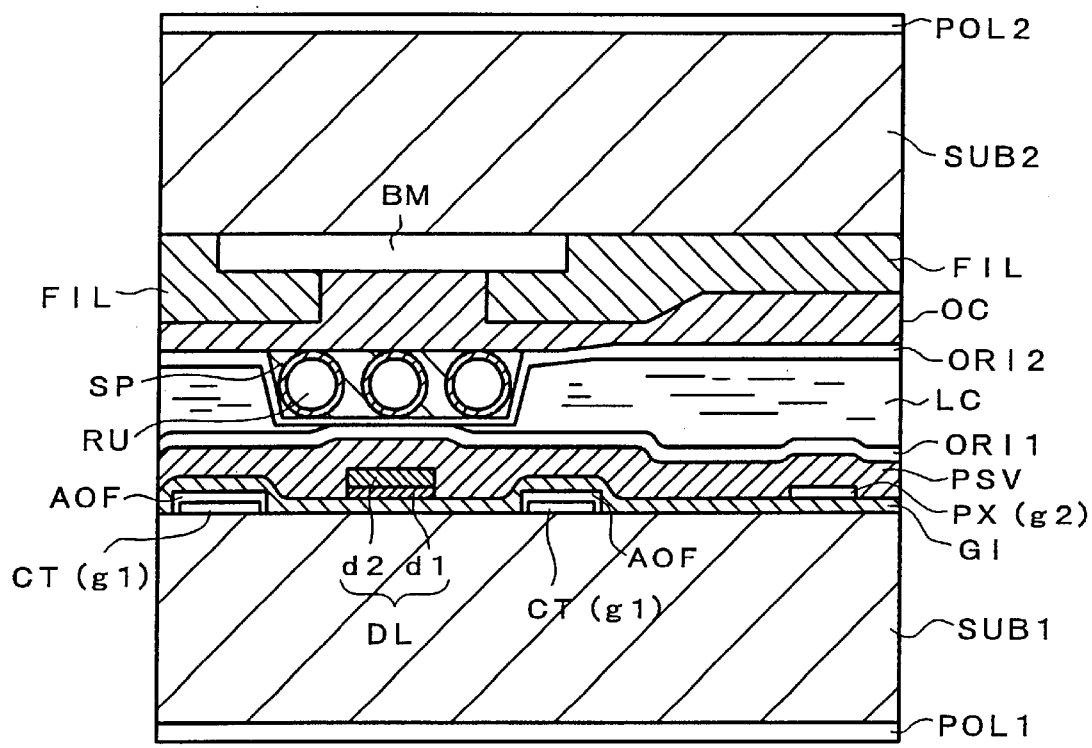
FIGS. 7A and 7B are schematic explanatory diagrams of a periphery of a pixel in the liquid crystal display panel constituting the active matrix type liquid crystal display device of the lateral electric field scheme as a third embodiment of the liquid crystal display devices according to the present invention.
Figure 7B:
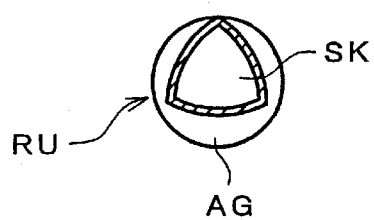

FIGS. 7A and 7B are schematic explanatory diagrams of a periphery of a pixel in the liquid crystal display panel constituting the active matrix type liquid crystal display device of the lateral electric field scheme as a third embodiment of the liquid crystal display devices according to the present invention, FIG. 7A shows a cross sectional view drawn in a similar manner to that for FIG. 5, and FIG. 7B shows a structural drawing of the spherical beads in FIG. 7A.

A photosensitive resin is generally utilized for the composing materials of the columnar spacer SP as described above, the aforementioned electrical characteristic is difficult to be set to a desired value. Therefore, this embodiment gives a predetermined electrical conductivity to the columnar spacer so as to adjust the columnar spacer as a whole to the desired value.

As a means for giving electrical conductivity to the columnar spacers in this embodiment, inorganic matter base spherical beads or plastic base spherical beads (e.g., the spherical beads formed of silica, in this embodiment) surfaces of which a metal film as a conductive material (e.g. silver, as a metal) is formed on or metal particulates (fine particles) are adhered to in a manner shown by FIG. 7B, are included in the columnar spacers SP. The conductive material should not be limited to silver, but be replaced by any other metals or nonmetals already known as conductive materials.

The electrical conductivity of the columnar spacer can be adjusted by the mixing amounts of these spherical beads which obtained electrical conductivity, and thus the electrical characteristic of the columnar spacer will be adjusted to the preferable value as a whole.

Figure 8:
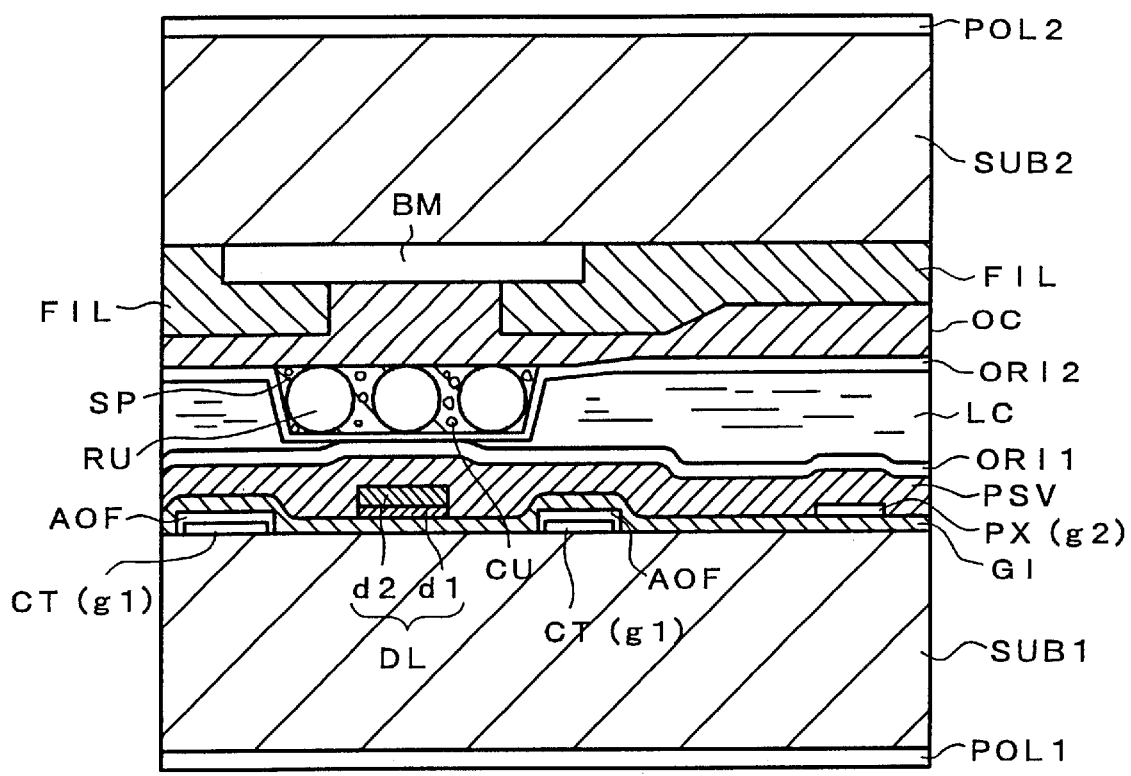
FIG. 8 is a cross sectional view drawn in the similar manner to that of FIG. 5 and being utilized for explaining a periphery of a pixel in the liquid crystal display panel constituting the active matrix type liquid crystal display device of the lateral electric field scheme as a fourth embodiment of the liquid crystal display devices according to the present invention, schematically.

FIG. 8 is a cross sectional view drawn in the similar manner to that of FIG. 5 and being utilized for explaining a periphery of a pixel in the liquid crystal display panel constituting the active matrix type liquid crystal display device of the lateral electric field scheme as a fourth embodiment of the liquid crystal display devices according to the present invention, schematically.

A photosensitive resin is generally utilized for the composing materials of the columnar spacer SP as explained in the third embodiment, the aforementioned electrical characteristic is difficult to be set to a desired value. Therefore, conductive particles CU are mixed together with inorganic matter base spherical beads or plastic base spherical beads (e.g., the spherical beads formed of silica, in this embodiment) into the columnar spacer.

Metallic particles of silver or else and nonmetallic particles of carbon black or else are enumerated as the conductive particles. In this embodiment, particles of carbon black are utilized for the conductive particles.

In addition, the columnar spacer SP may contain only the conductive particles CU without the spherical beads RU, if the conductive particles CU have particle diameters equivalent to those of the spherical beads RU. In this case, the conductive particles CU need to have mechanical characteristics equivalent to those of the spherical beads RU, and characteristics for absorbing the noise field thereinto without any influence on a displaying performance of the liquid crystal display device.

According to this embodiment, the electrical characteristic of the columnar spacer SP is adjusted to the desired value as a whole. Moreover, the spherical beads having electrical conductivity mentioned in the preceding embodiment may be mingled together with the spherical beads RU and the conductive particles CU.

Figure 9:
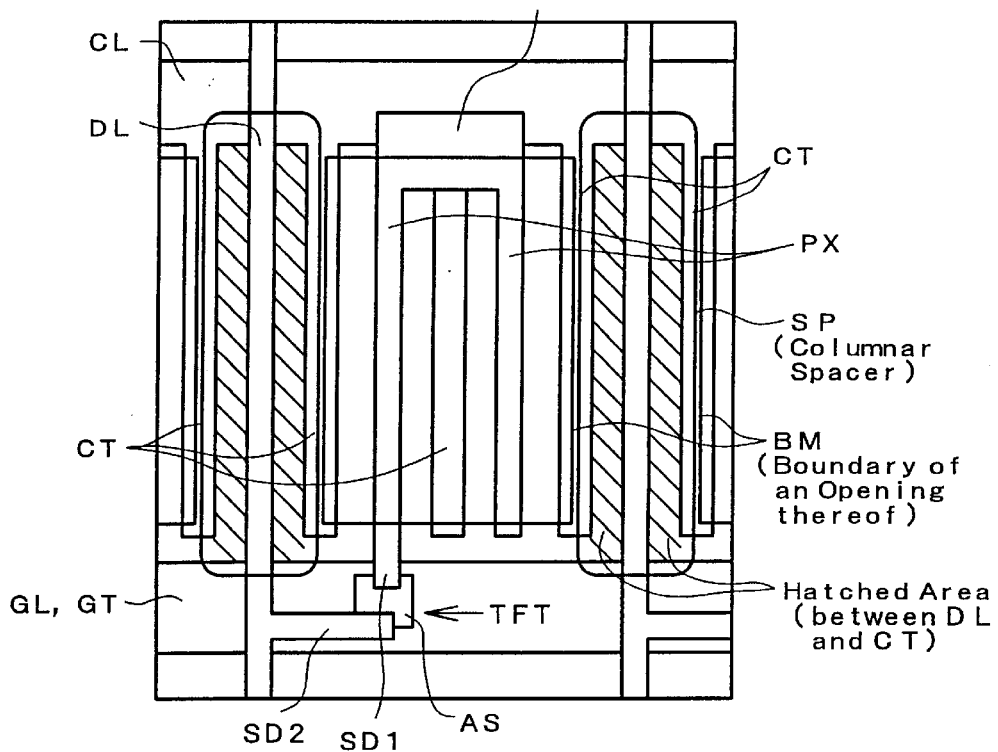
FIG. 9 is a plan view for explaining a periphery of a pixel of a liquid crystal display panel constituting an active matrix type liquid crystal display device of a lateral electric field scheme as a fifth embodiment of a liquid crystal display device according to the present invention, schematically.

FIG. 9 is a plan view for explaining a periphery of a pixel of a liquid crystal display panel constituting an active matrix type liquid crystal display device of a lateral electric field scheme as a fifth embodiment of a liquid crystal display device according to the present invention, schematically. Each of the same notations in FIG. 9 as that in FIG. 1 denote elements having the same functions as each other.

The columnar spacer SP is formed to cover a whole area between the video signal line DL and the counter electrodes CT (hatched area in FIG. 9, being formed along the video signal line DL for each pixel) in this embodiment. In this embodiment, resistivity of the columnar spacer SP is set to be larger than that of the liquid crystals, and a relative dielectric constant (relative permittivity) of the columnar spacer SP is set to be smaller than that of the liquid crystals.

The liquid crystals (the liquid crystal compounds) utilized for the liquid crystal display panel constituting the liquid crystal display device of the lateral electric field scheme have resistivity not smaller than $10^{10}$ $\Omega \cdot cm$ and a relative dielectric constant not smaller than 10. The composing material of the columnar spacer SP is a photosensitive resin.

The photosensitive resin is usually (electrically) an insulating material, which has resistivity not smaller than $10^{14}$ $\Omega \cdot cm$ and a relative dielectric constant smaller than 10.

In the construction of this embodiment, the liquid crystals are excluded from an area between the pixels adjacent to each other by the columnar spacer SP disposed therebetween so that any of the liquid crystals are driven by the noise field generated thereat. Even if small light leakage is generated around the pixels, the small light leakage is obstructed by the black matrix BM in case a polarizing axis of the polarizer plate POL1 at a side of incident light into the liquid crystal panel is not in parallel with that of the polarizer plate POL2 at a side of emitted light therefrom. Therefore, a demanded value of the optical density of the black matrix BM can be lowered.

According to this construction, the light leakage is so suppressed that deterioration of a contrast and brightness irregularity in a displayed image are reduced and cross talks therein are suppressed sufficiently to obtain a display of a high quality.

The construction of FIG. 9 reduces a load on the video signal line, so that distortion of voltage waveforms to be written in (applied to) the signal wiring thereof can be reduced. The load on the video signal line is defined as a product of a capacitance C generated between the video signal line and an electrode adjacent thereto being multiplied by a resistance R thereof, C·R.

Figure 10:
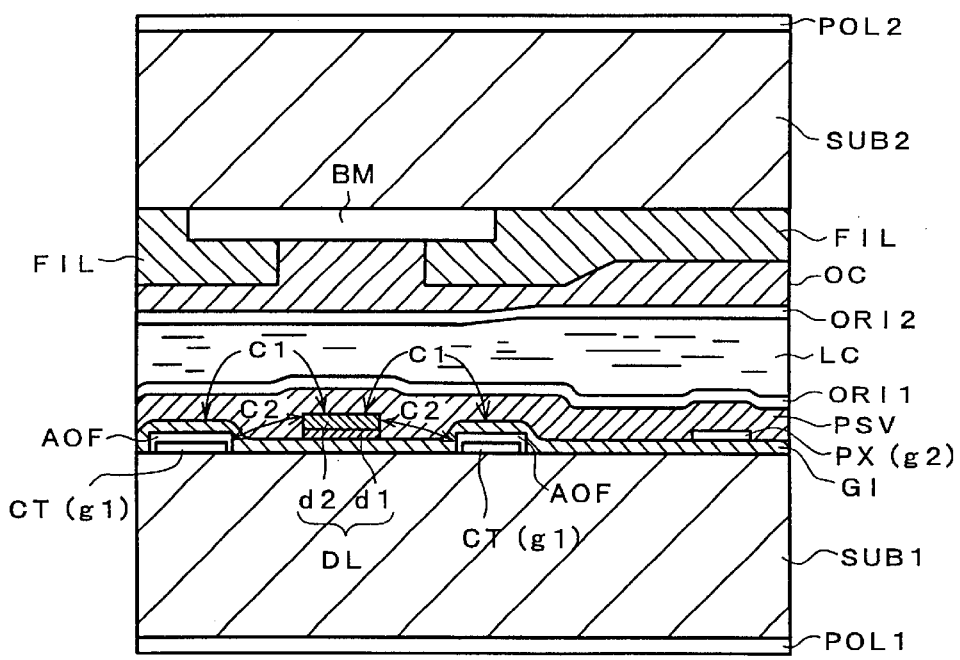
FIG. 10 is an explanatory drawing of the capacitance generated between the video signal line and the counter electrode in the liquid crystal display panel constituting the liquid crystal display device of the lateral electrical field scheme.

FIG. 10 is an explanatory drawing of the capacitance generated between the video signal line and the counter electrode in the liquid crystal display panel constituting the liquid crystal display device of the lateral electrical field scheme. The video signal line DL is located in a area hidden by the black matrix BM, and the counter electrodes CT are arranged at both sides of the video signal line.

The aforementioned capacitance C is the sum of capacitance C1 generated between the video signal line DL and the counter electrode CT and capacitance C2 generated between the video signal line DL and the counter electrode CT through the insulating film PSV.

If the columnar spacer SP is formed in a manner shown in FIG. 9, the capacitance C1 is defined by relative dielectric constants of the columnar spacer SP and the insulating film PSV, and the capacitance C2 is determined by the relative dielectric constant of the insulating film PSV regardless of an existence of the columnar spacer SP. Therefore, if the relative dielectric constant of the columnar spacer SP is smaller than those of the liquid crystals, the capacitance C1 also becomes smaller. Consequently, the load of the video signal line DL is reduced by the existence of the columnar spacer SP.

As a result, deterioration of a contrast and brightness irregularity in a displayed image is reduced by suppressing the light leakage, cross talk therein is also suppressed, and moreover the load on the video signal line is reduced, so that a display of high quality can be obtained.

Figure 11:
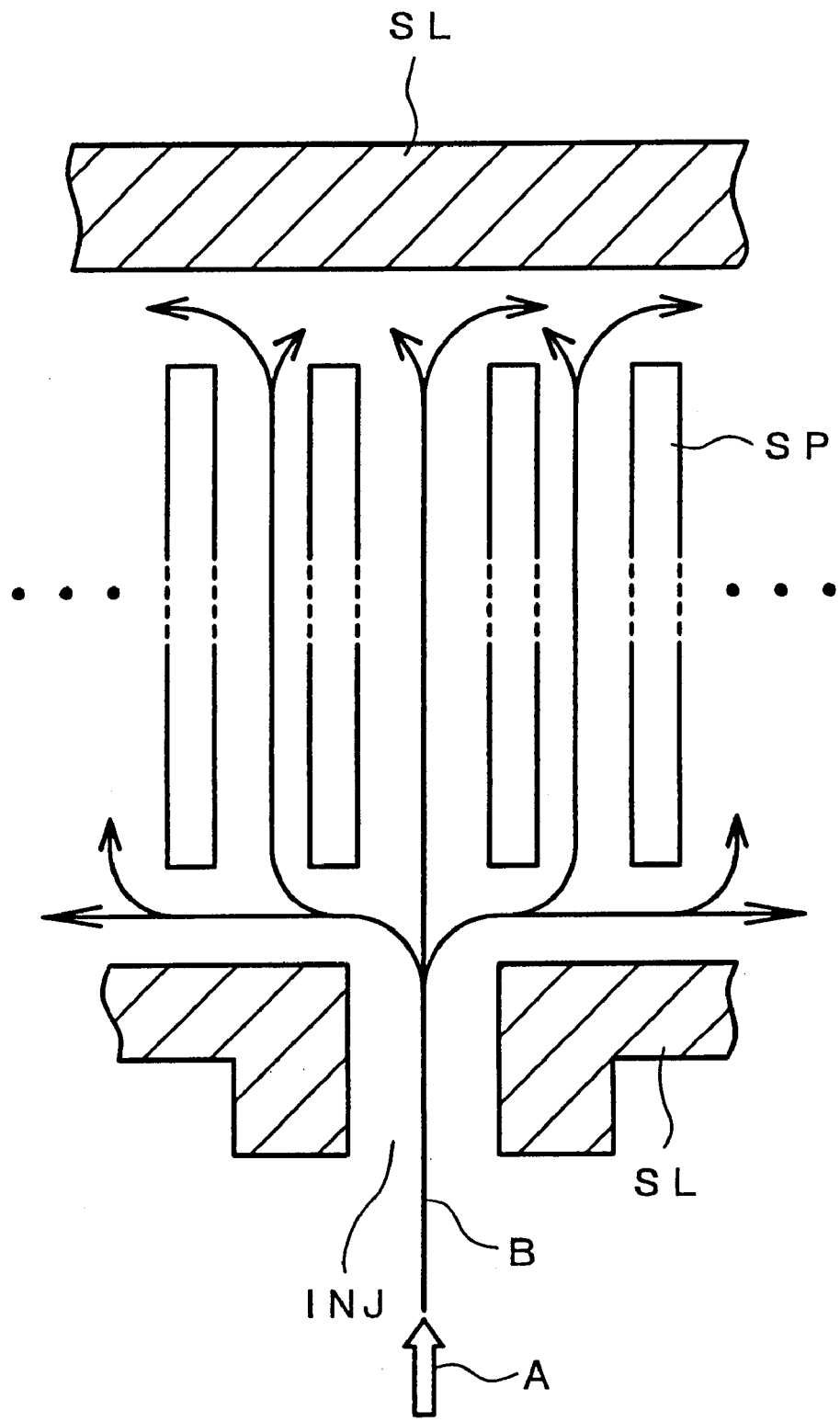
FIG. 11 is a schematic diagram for explaining an example of an arrangement of the columnar spacers constituting an active matrix type liquid crystal display device of the lateral electric field as a sixth embodiment of the liquid crystal display devices according to the present invention.

FIG. 11 is a schematic diagram for explaining an example of an arrangement of the columnar spacers constituting an active matrix type liquid crystal display device of the lateral electric field as a sixth embodiment of the liquid crystal display devices according to the present invention. In FIG. 11, a seal (a sealing material) SL enclosing an effective displaying region of the liquid crystal display panel and a liquid crystal filling port INJ formed at a part of the seal SL are shown, an arrow A denotes an injection direction of the liquid crystals (into the effective displaying region), and lines B having arrows denotes an injection route of the liquid crystals.

In this embodiment, the columnar spacers as explained in the fifth embodiment are formed to be extended continuously along the extension directions of the video signal lines DL and the counter electrodes CT in the displaying region of the liquid crystal display panel. The extension direction of the columnar spacer SP is set in parallel with the injection direction of the liquid crystals through the liquid crystal filling port INJ of the liquid crystal display panel.

However, spaces are provided at end potions of the columnar spacer SP so as to pass the liquid crystals therethrough. The liquid crystals are injected through the filling port INJ as the arrow A shows, and then flow as the arrows B show so as to fill a space between a pair of substrates of the liquid crystal display panel therewith.

Either of the columnar spacers being explained previously referring FIGS. 1, 2, 5, 7, and 8 can be utilized for this embodiment, and a gross area of the columnar spacers SP in the displaying region can be so large as the cell gap of the liquid crystal display panel is formed more uniformly.

Figure 12:
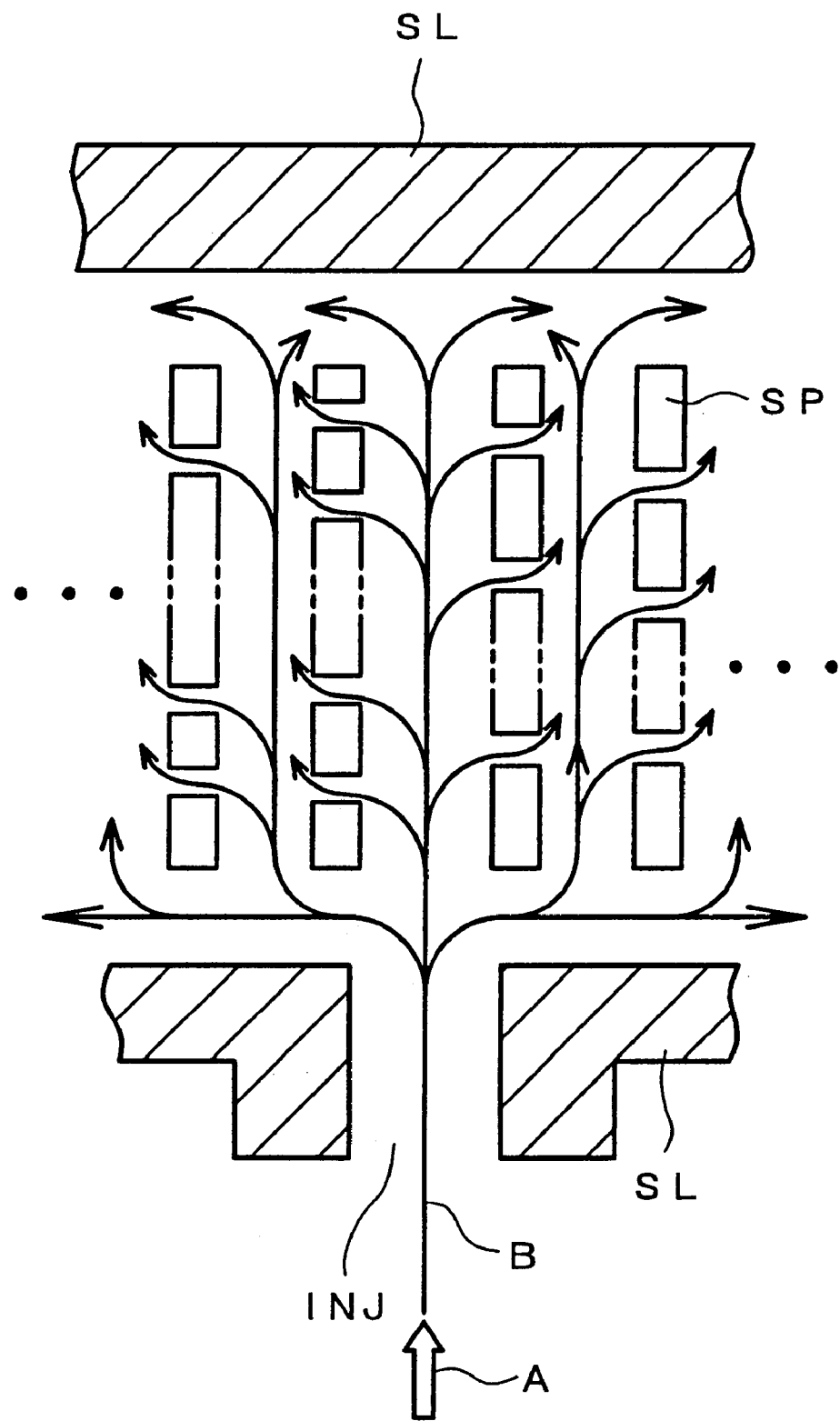
FIG. 12 is a schematic diagram for explaining an example of an arrangement of the columnar spacers constituting an active matrix type liquid crystal display device of the lateral electric field as a seventh embodiment of the liquid crystal display devices according to the present invention.

FIG. 12 is a schematic diagram for explaining an example of an arrangement of the columnar spacers constituting an active matrix type liquid crystal display device of the lateral electric field as a seventh embodiment of the liquid crystal display devices according to the present invention, and each of the same notations in FIG. 12 as that in FIG. 11 denote elements having the same functions as each other. In this embodiment, passes for the liquid crystals are provided by dividing the columnar spacers as explained in FIG. 11 in the extension direction thereof regularly or irregularly so as to increase passes for the liquid crystals injected to a space between the pair of substrates of the liquid crystal display panel.

Portions of the columnar spacer to be divided had better be selected at a part thereof crossing the scanning signal line GL or the counter voltage signal line CL in FIG. 1. Moreover, setting dividing lengths of the columnar spacer SP irregularly suppresses the brightness irregularity by averaging light leakage, even if the light leakage appears in peripheries of the pixels adjacent to the divided portions of the columnar spacers, and furthermore suppresses generation of moire fringes in a displayed image.

Either of the columnar spacers being explained previously referring FIGS. 1, 2, 5, 7, and 8 can be utilized for this embodiment, and a gross area of the columnar spacers SP in the displaying region can be so large as the cell gap of the liquid crystal display panel is formed more uniformly.

Furthermore, any combinations among the columnar spacer of this embodiment, the columnar spacer in another embodiment of FIG. 11, and the embodiment being explained with reference to FIG. 1 or FIG. 9 can be available.

By each construction of the embodiments according to the present invention explained above, the contrast and the brightness in the displayed image are improved, the cross talk generation is suppressed, so that a liquid crystal display device having the ability to display images with high qualities is realized.

Outlines of the fabrication processes for a liquid crystal display panel constituting a liquid crystal display device of each embodiment according to the present invention mentioned above are explained with reference to the structures in FIGS. 1 and 2. In addition, an explanation for the liquid crystal display panel having a structure other than that of the first embodiment will refer to the respective drawing corresponding to the structure.

Fabrication Method of the Color Filter Substrate

Process (1)

First of all, photosensitive black resist is coated on a glass substrate of 0.7 mm or 1.1 nun in thickness as the another of the substrates SUB2, then exposed with a photomask having a predetermined pattern, developed, and baked sequentially, so that the photosensitive black resist is formed into a black matrix after the sequence of processing steps.

Then, color filter layers FIL are formed out of photosensitive resinous resists having red, green, and blue colors respectively, by repeating the similar sequence including an exposure step, a development step, and a baking step to that mentioned above for every color of the resists. Neither of FIG. 1 nor 2 shows, however the color filter layers FIL comprise a red-colored layer FIL (R), a green-colored layer FIL (G), and a blue-colored layer FIL (B). Next, transparent photosensitive resin or transparent thermosetting resin is coated so as to cover upper most surfaces of the color filter layers FIL and the black matrix BX, then exposed and baked sequentially, or baked, and finally formed into a protective film OC which functions as a leveling layer, also. In addition, if neither flatness of the upper most surfaces nor characteristics of the color filter layers as a chemical-resistance, heat-resistance, contamination possibility for the liquid crystals, etc. causes any problems, the protective film OC may be omitted.

Process (2)

Photosensitive resin is coated on the protective film OC. Spherical beads or conductive materials are added into the photosensitive resin beforehand, the columnar spacer will be formed in a manner including these beads or these particles therein.

Process (3)

Ultraviolet rays are irradiated onto any positions (any portions) of the photosensitive resin at which the columnar spacers SP should be formed through a photomask having a predetermined pattern. In this process, both negative-type photosensitive resin (a portion thereof being exposed in a ultraviolet ray is hardened) and positive-type photosensitive resin (a portion thereof being exposed in a ultraviolet ray will be removed by development) may be used as the aforementioned photosensitive resin. The negative-type photosensitive resin is utilized in this embodiment.

Process (4)

The photosensitive resin except for portions thereof which will be formed into the columnar spacers SP is removed, and then the rests of the photosensitive resin are baked.

Next, a film material of the alignment control layer is coated over an upper most surface where the rests of the photosensitive resin remain, then baked, and finally a rubbing treatment or an optical alignment treatment is applied to the layer of the film material for providing a liquid crystals-aligning property thereto so as to obtain the alignment control layer ORI2.

In addition, the columnar spacers SP may be formed on the active matrix substrate SUB1. In this case, the columnar spacers SP are formed on the insulating film PSV of the active matrix substrate using the above mentioned sequence of the processes (2)–(4).

Fabrication of an Active Matrix Substrate

The active matrix substrate SUB1 can be fabricated by a process similar to the known process of forming a thin film transistor. This active matrix substrate SUB1 uses a glass substrate having a thickness of 0.7 mm or 1.1 mm, and deposition and patterning are repeated over this substrate. Thus, thin film transistors TFT made of amorphous silicon AS, and storage capacitance Cstg as well as electrode groups such as pixel electrodes PX, source electrodes SD1 and counter electrodes CT are formed. In addition, plural video signal lines DL, plural drain electrodes SD2 and plural counter voltage signal lines CL for applying predetermined voltages to the above-described electrodes via thin film transistors TFT as well as plural scanning signal lines GL and plural gate electrodes GT all of which control the thin film transistors TFT are formed in a grid-like form.

The thin film transistors TFT as well as the above-described electrode groups and lines are covered with the insulation layers GI and the protective layers PSV. After that, an alignment layer material is applied and baked and the alignment layer is given a liquid crystal alignment control function by a rubbing treatment or an optical alignment treatment, thereby forming the orientation control film ORI1.

The substrate SUB1 fabricated in the above-described manner and the color filter substrate SUB2 fabricated in the above-described embodiment are assembled to oppose each other, and the peripheral portion of the assembly is fixed with a sealing material (an adhesive material) SL, excluding a liquid crystal filling port INJ (Ref. FIGS. 11, 12). Liquid crystal compounds are sealed between the two substrates, and the liquid crystal filling port is sealed with an end-sealing material. After that, the gap between the two substrates is defined with the columnar spacers by a press, whereby a liquid crystal display device having a predetermined cell gap is obtained.

Driving means and a specific product example of a liquid crystal display device to which the present invention is applied will be described below.

Figure 13:
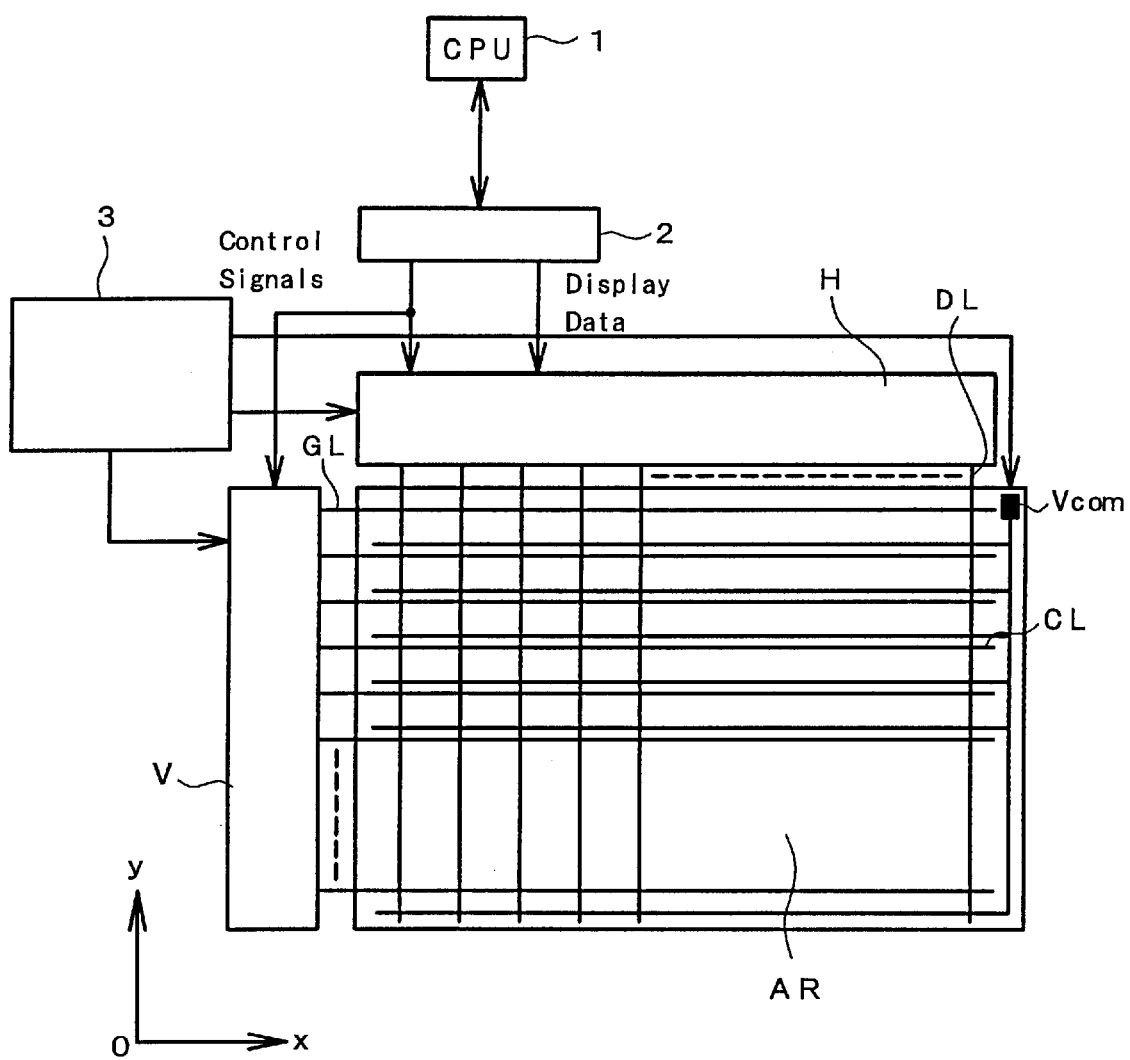
FIG. 13 is an explanatory diagram showing driving means for the liquid crystal display device according to the present invention.

FIG. 13 is a schematic explanatory view illustrating the driving means for a liquid crystal display device to which the present invention is applied. The liquid crystal display device of the lateral electric field scheme has an image display portion formed by an assembly of plural pixels arrayed in matrix form, and each of the pixels is constructed to be able to individually modulate and control transmitted light from a back light (not shown) arranged at the back of the liquid crystal display device.

The scanning signal lines GL, the counter voltage signal lines CL and the video signal lines DL are formed over an effective pixel area AR of the active matrix substrate SUB1 which is one constituent element of the liquid crystal display device. The scanning signal lines GL and the counter voltage signal lines CL are disposed to be extended in the x direction (the row direction) of the effective pixel area AR and to be juxtaposed in the y direction (the column direction) of the same. The video signal lines DL are insulated from both the scanning signal lines GL and the counter voltage signal lines CL, and are disposed to be extended in the y direction and to be juxtaposed in the x direction.

A unit pixel is formed in each of the rectangular areas surrounded by the scanning signal lines GL, the counter voltage signal lines CL and the image signal lines DL.

The liquid crystal display device is provided with a vertical scanning circuit V and a video signal driving circuit H as its external circuits. A scanning signal (voltage) is sequentially supplied to each of the scanning signal lines GL by the vertical scanning circuit V, and in synchronism with that timing, a video signal (voltage) is supplied to the video signal lines DL from the video signal driver circuit H.

Each of the vertical scanning circuit V and the video signal driving circuit H is supplied with electric power from a liquid crystal driving power supply circuit 3, and image information from a CPU 1 is separated into display data and a control signal and inputted to the circuits V and H by a controller 2.

Figure 14:
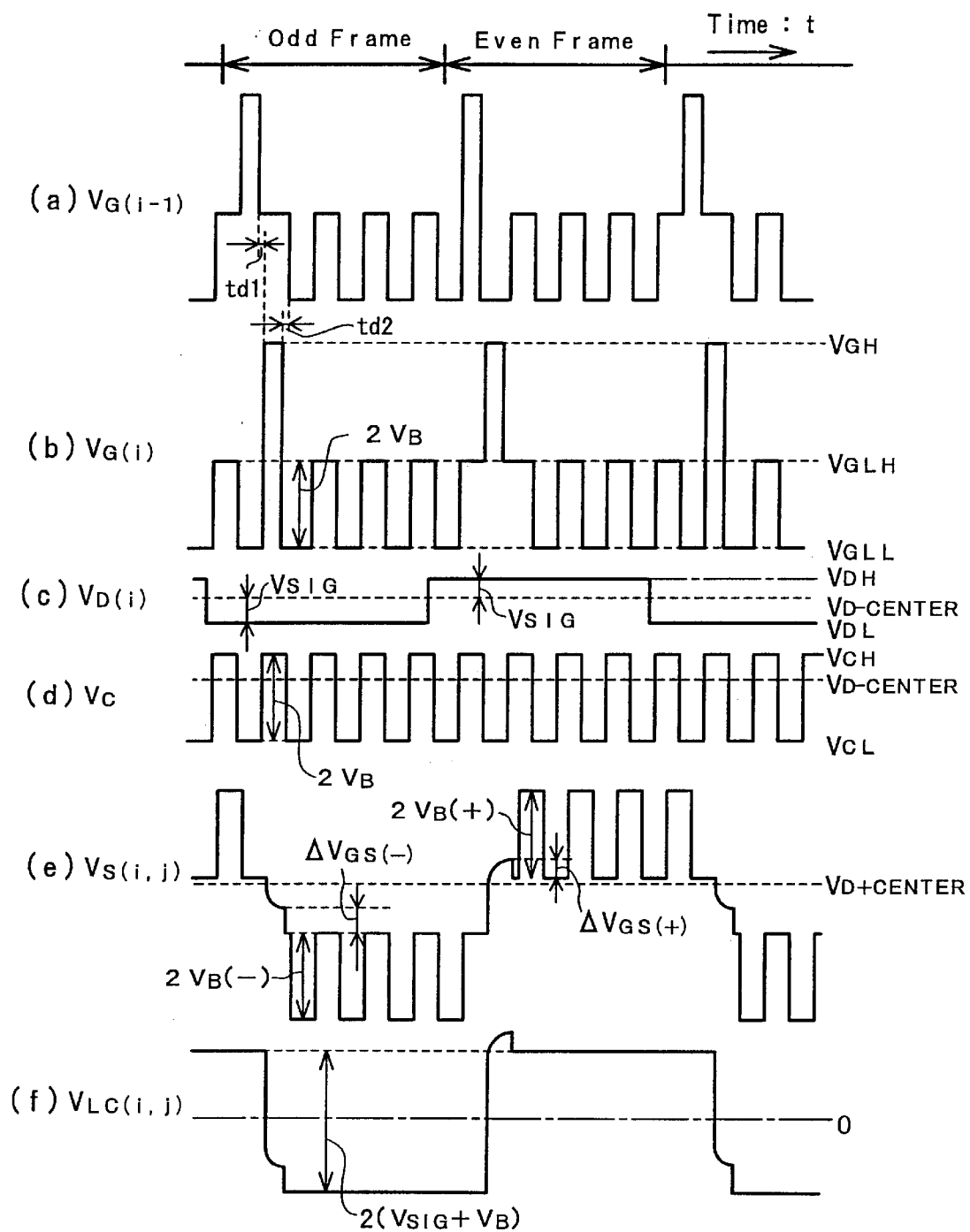
FIG. 14 is an explanatory diagram of one instance of driving waveforms of the liquid crystal display device according to the present invention.

FIG. 14 is an explanatory view showing one example of driving waveforms of the liquid crystal display device to which the present invention is applied. In FIG. 14, a counter voltage to be applied to the counter electrode is formed as an alternating current rectangular wave having two values VCH and VCL, and the non-selection voltage of each scanning signal VG(i−1) and VG(i) is varied between two values VCH and VCL at intervals of one scanning period in synchronism with the counter voltage. The amplitude of the counter voltage and the amplitude of the non-selection voltage are made the same.

A video signal voltage to be applied to the pixel electrode is a voltage obtained by subtracting ½ of the amplitude of the counter voltage from a voltage to be applied to the liquid crystal layer.

The counter voltage may also be a direct current voltage, but by forming the counter voltage as an alternating current voltage, it is possible to decrease the maximum amplitude of the video signal voltage, whereby it is possible to use a video signal driver circuit (signal-side driver) of low breakdown voltage.

Figure 15:
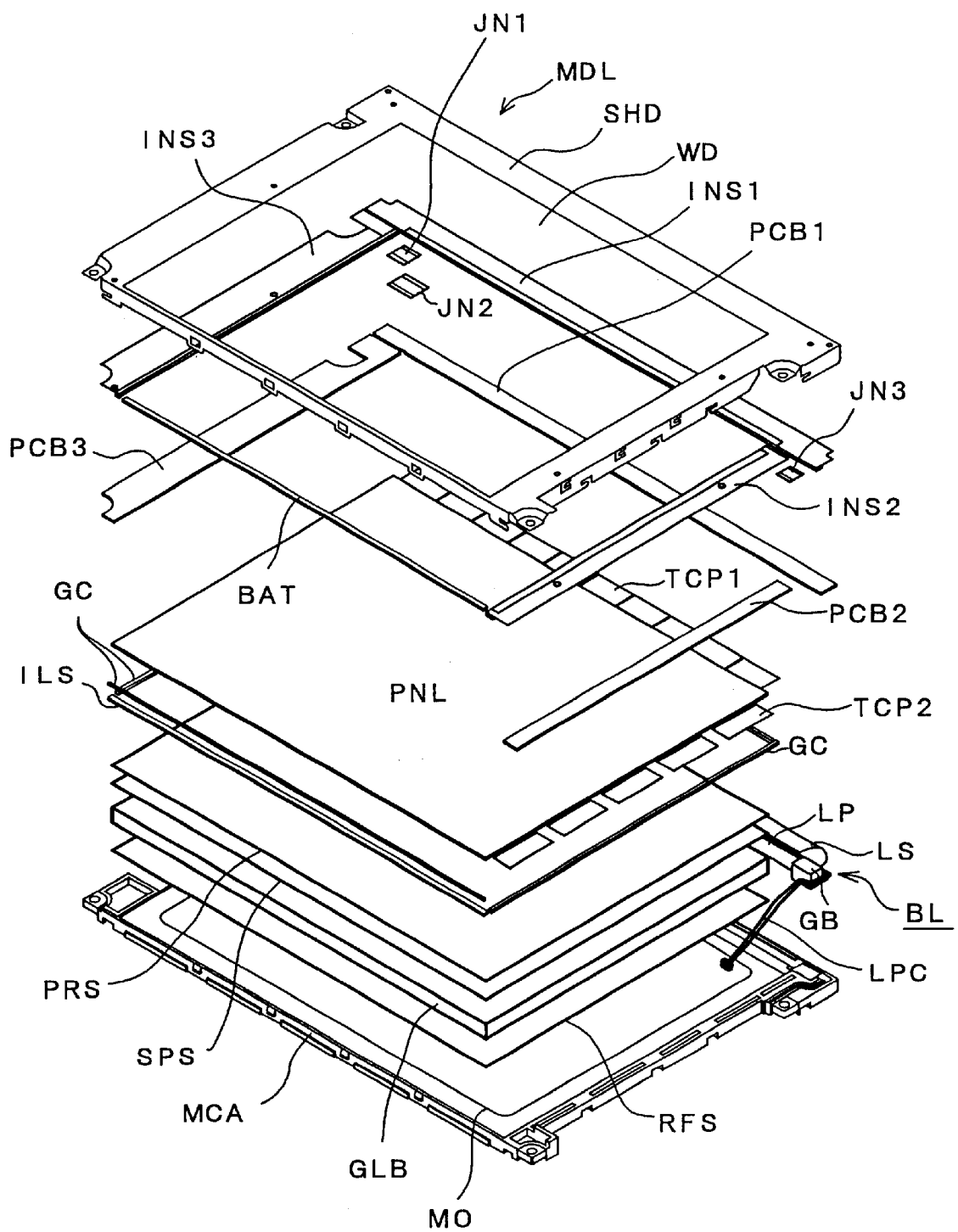
FIG. 15 is a disassembled squint view of a liquid crystal display device for explaining a whole construction of the liquid crystal display devices according to the present invention.

FIG. 15 is a developed perspective view illustrating the entire construction of the liquid crystal display device according to the present invention, and illustrates a specific structure of the liquid crystal display device (hereinafter referred to as a liquid crystal module: MDL which integrally includes two substrates SUB1 and SUB2, driving means, a back light and other constituent members).

Symbol SHD denotes a shield case made of a metal sheet (also called a metal frame), symbol WD a display window, symbols INS1 to INS3 insulating sheets, symbols PCB1 to PCB3 circuit boards which constitute the driving means (PCB1 is a drain-side circuit board: a video signal line driving circuit board, PCB2 is a gate-side circuit board, and PCB3 is an interface circuit board), symbols JN1 to JN3 joiners which electrically connect the circuit boards to one another, symbols TCP1 and TCP2 tape carrier packages, symbol PNL a liquid crystal panel, symbol GC a rubber cushion, symbol ILS a light shielding spacer, symbol PRS a prism sheet, symbol SPS a diffusing sheet, symbol GLB a light guide plate, symbol RFS a reflecting sheet, symbol MCA a lower case (mold frame) which is formed by integral molding, symbol MO an aperture of the lower case MCA, symbol LP a fluorescent tube, symbol LPC a lamp cable, symbol GB a rubber bush which supports the fluorescent tube LP, symbol BAT a double-sided adhesive tape, and symbol BL a back light made of a fluorescent tube, a light guide plate or the like. The liquid crystal module MDL is assembled by stacking diffusing plate members in the shown layered arrangement.

The liquid crystal module MDL has two kinds of housing-holding members, the lower case MCA and the shield case SHD, and the metal-made shield case SHD in which the insulating sheets INS1 to INS3, the circuit boards PCB1 to PCB3 and the liquid crystal panel PNL are fixedly housed is combined with the lower case MCA in which the back light BL made of the fluorescent tube LP, the light guide plate GLB, the prism sheet PRS and the like are housed.

An integrated circuit chip for driving each pixel of the liquid crystal panel PNL is mounted on the video signal line driving circuit board PCB1, and an integrated circuit chip for receiving a video signal and a control signal such as a timing signal from an external host, a timing converter TCON which processes timing and generates a clock signal and the like are mounted on the interface circuit board PCB3.

The clock signal generated by the aforesaid timing converter is supplied to the integrated circuit chip mounted on the video signal line driving circuit board PCB1 via a clock signal line CLL which is formed in the interface circuit board PCB3 and the video signal line driving circuit board PCB1.

Each of the interface circuit board PCB3 and the video signal line driving circuit board PCB1 is a multilayer printed circuit board, and the clock signal line CLL is formed as an internal layer line of the interface circuit board PCB3 and the video signal line driving circuit board PCB1.

The drain-side circuit board PCB1, the gate-side circuit board PCB2 and the interface circuit board PCB3 for driving TFTs are connected to the liquid crystal panel PNL by the tape carrier packages TCP1 and TCP2, and these circuit boards are connected to one another by the joiners JN1, JN2 and JN3.

The liquid crystal panel PNL is a lateral electric field type of liquid crystal display device according to the above-described present invention, and is provided with the aforesaid columnar spacers of the above-described embodiments for maintaining the gap between the two substrates at a predetermined value.

Figure 16:
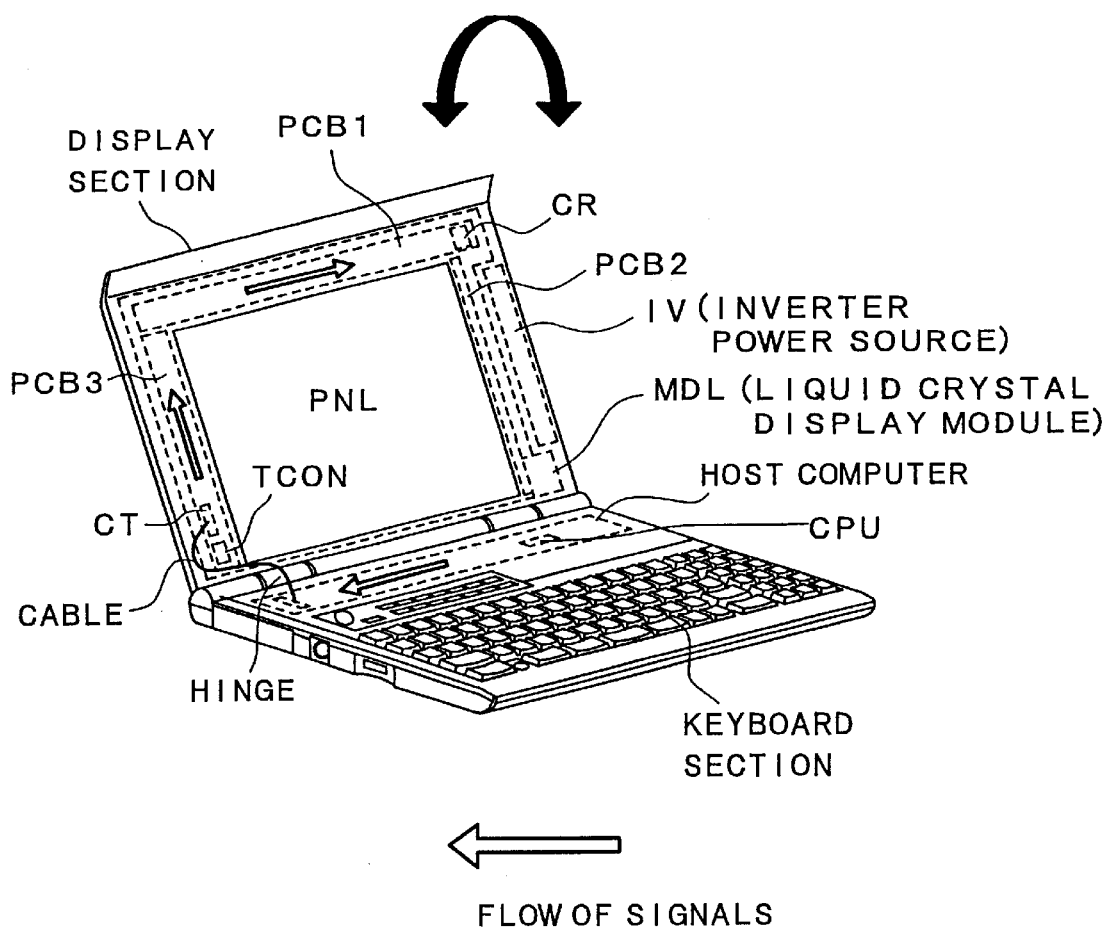
FIG. 16 is a squint view of a notebook type computer as one instance of electronic equipment in which a liquid crystal display device according to the present invention is mounted.

FIG. 16 is a perspective view of a notebook type computer which is one example of electronic equipment in which a liquid crystal display device according to the present invention is mounted.

This notebook type computer (portable personal computer) is made of a keyboard block (body block) and a display block which is joined to the keyboard block by a hinge. The keyboard block houses signal generating functions such as a keyboard, a host (host computer) and a CPU. The display block has the liquid crystal panel PNL, and the driving circuit boards PCB1 and PCB2, the PCB3 provided with the control chip TCON, and an inverter power supply board which is a back light power supply are mounted in the peripheral portion of the liquid crystal panel PNL.

In addition, the liquid crystal module described above with reference to FIG. 11, which is integrally provided with the liquid crystal panel PNL, the various kinds of circuit boards PCB1, PCB2 and PCB3, the inverter power supply board and the back light, is mounted in the notebook type computer.

As is apparent from the foregoing description, according to the present invention, the contrast deterioration and the brightness irregularity due to the noise field are suppressed by an electrical characteristics of the columnar spacer being arranged so as to cover an area between the video signal line and the counter electrode, whereby a liquid crystal display device having an ability of a displaying performance of a high image quality can be provided. Moreover, the cell gap of the liquid crystal display device can be provided uniformly by mingling particles like beads with the columnar spacer so as to reinforce the mechanical characteristic of the columnar spacers, whereby a liquid crystal display device displaying images of high qualities with uniform brightness in a displaying screen thereof can be provided.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A liquid crystal display device comprising:
   a liquid crystal layer interposed between a pair of substrates;
   at least a video signal line formed on one of said pair of substrates;
   at least a first electrode formed at a left side of the video signal line and a second electrode formed at a right side of the video signal line; and
   a columnar spacer formed above the video signal line, wherein at least a portion of said columnar spacer is positioned to overlap with said first and second electrodes.

2. A liquid crystal display device according to claim 1, wherein each of said first and second electrodes includes a first edge and a second edge opposite to the first edge,
   said columnar spacer overlaps with said first edge of said first electrode and with said first edge of said second electrode,
   a first edge of said columnar spacer and said second edge of first electrode are spaced apart from each other,
   a second edge of said columnar spacer and said second edge of second electrode are spaced apart from each other.

3. A liquid crystal display device according to claim 1, wherein said first electrode and said second electrode are integrally formed.

4. A liquid crystal display device according to claim 1, wherein a black matrix is formed to overlap the columnar spacer, said black matrix being formed wider than the columnar spacer.

5. A liquid crystal display device according to claim 1, wherein the liquid crystal display is an IPS type device.

6. A liquid crystal display device comprising:
   a liquid crystal layer interposed between a pair of substrates;
   at least a video signal line formed on one of said pair of substrates;
   at least a first pixel adjacent a left side of the video signal line and a second pixel adjacent a right side of the video signal line;
   at least a first electrode formed for the first pixel and a second electrode formed for the second pixel; and
   a columnar spacer formed above the video signal line, wherein at least a portion of said columnar spacer is positioned to overlap with said first and second electrodes.

7. A liquid crystal display device according to claim 6, wherein each of said first and second electrodes includes a first edge and a second edge opposite to the first edge,
   said columnar spacer overlaps with said first edge of said first electrode and with said first edge of said second electrode,
   a first edge of said columnar spacer and said second edge of first electrode are spaced apart from each other,
   a second edge of said columnar spacer and said second edge of second electrode are spaced apart from each other.

8. A liquid crystal display device according to claim 6, wherein said first electrode and said second electrode are integrally formed.

9. A liquid crystal display device according to claim 6, wherein a black matrix is formed to overlap the columnar spacer, said black matrix being formed wider than the columnar spacer.

10. A liquid crystal display device according to claim 6, wherein the liquid crystal display is an IPS type device.

11. A liquid crystal display device comprising:
    a liquid crystal layer interposed between a pair of substrates;
    at least a video signal line formed on one of said pair of substrate;
    at least a counter electrode having a first edge portion positioned toward to the video signal line and a second edge portion positioned away from the video signal line; and
    at least a columnar spacer having at least one side edge portion formed to overlap with the first edge portion of the counter electrode, and defined to be spaced apart from the second edge portion of the counter electrode.

12. A liquid crystal display device according to claim 11, wherein a black matrix is formed to overlap the columnar spacer, said black matrix being formed wider than the columnar spacer.

13. A liquid crystal display device according to claim 11, wherein the liquid crystal display is an IPS type.

14. A liquid crystal display device comprising:
    a liquid crystal layer interposed between first and second substrates;
    at least a video signal line formed on said first substrate;
    at least a black matrix formed on said second substrate;
    at least one columnar spacer positioned between said first and second substrates, and
    a plurality of color filters, each of the color filters having an edge portion positionally arranged with the black matrix, wherein said at least one columnar spacer includes a side edge portion positioned to overlap with the edge portion of an adjacent one of the plurality of color filters, and a side edge portion of the black matrix is formed to overlap beyond the side edge portion of said columnar spacer.

15. A liquid crystal display device according to claim 14, wherein said columnar spacer is positioned above the video signal line.

16. A liquid crystal display device according to claim 15, further comprising:
    at least one counter electrode is formed on both sides of the video signal line, and at least one side edge portion the black matrix overlaps each of said counter electrodes.

17. A liquid crystal display device according to claim 16, wherein the liquid crystal display is an IPS type.

* * * * *